US009713085B2

United States Patent
Kotecha et al.

(10) Patent No.: US 9,713,085 B2
(45) Date of Patent: Jul. 18, 2017

(54) DYNAMIC ACTIVATION AND DEACTIVATION OF ACCESS POINTS

(71) Applicant: Verizon Patent and Licensing Inc., Arlington, VA (US)

(72) Inventors: Lalit R. Kotecha, San Ramon, CA (US); Matthew W. Nelson, Pleasanton, CA (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 63 days.

(21) Appl. No.: 14/292,326

(22) Filed: May 30, 2014

(65) Prior Publication Data

US 2015/0351027 A1 Dec. 3, 2015

(51) Int. Cl.
*H04W 36/00* (2009.01)
*H04W 52/02* (2009.01)
*H04W 72/00* (2009.01)
*H04W 24/02* (2009.01)
*H04W 36/16* (2009.01)

(52) U.S. Cl.
CPC ....... *H04W 52/0206* (2013.01); *H04W 24/02* (2013.01); *H04W 36/165* (2013.01); *H04W 72/00* (2013.01); *Y02B 60/50* (2013.01)

(58) Field of Classification Search
USPC ....................................................... 370/311
See application file for complete search history.

(56) References Cited

U.S. PATENT DOCUMENTS

| | | | | |
|---|---|---|---|---|
| 2003/0153330 A1* | 8/2003 | Naghian | ................ | G01C 21/00 455/456.1 |
| 2004/0229621 A1* | 11/2004 | Misra | .................... | H04W 16/08 455/445 |
| 2010/0067421 A1* | 3/2010 | Gorokhov | ......... | H04W 52/0206 370/311 |
| 2010/0246460 A1* | 9/2010 | Kholaif | ............. | H04W 52/0216 370/311 |
| 2011/0007680 A1* | 1/2011 | Kadous | ............. | H04W 52/0219 370/311 |
| 2011/0058478 A1* | 3/2011 | Krym | .................... | H04W 28/08 370/237 |
| 2014/0113612 A1* | 4/2014 | Shu | ........................ | H04W 48/14 455/418 |

* cited by examiner

*Primary Examiner* — Omar Ghowrwal
*Assistant Examiner* — Angel Brockman

(57) ABSTRACT

A network selection device may determine that a communication between a user device and a first network device should be transferred from the first network device to a second network device that is in an idle state; output an instruction to cause the second network device to exit the idle state and communicate with the user device; determine that the second network device is unused or underutilized; and output, based on determining that the second network device is unused or underutilized, an instruction to cause the second network device to reenter the idle state.

20 Claims, 9 Drawing Sheets

DYNAMIC ACTIVATION AND DEACTIVATION OF ACCESS POINTS

BACKGROUND

A cellular network may include multiple types of wireless network devices via which a user device may access the cellular network. For example, the cellular network may include a base station (e.g., corresponding to a "macrocell") and an access point (e.g., corresponding to a "microcell," a "picocell," a "femtocell," etc.). A base station and access point may implement different wireless technologies at different frequency ranges ("bands"). A base station may have a broader communication range (e.g., several square miles) than that of an access point, but may provide lower bandwidth than an access point. An access point may have a smaller communication range than a base station, but may provide higher bandwidth than the base station.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may dynamically activate and deactivate wireless access points in a network (e.g. a cellular network). For example, an access point (e.g., a network device associated with a "microcell", a "femtocell", a "picocell", etc.) may exit an idle state or be activated (e.g., powered on, awoken from a sleep or low-powered mode, etc.) when a user device is located within a communication range of the access point. The access point may reenter the idle state or be deactivated (e.g., powered off, enter a sleep or low-powered mode, etc.) when the access point becomes unused or underutilized (e.g., when no user devices are in communication with the access point). As a result, the access point may exit an idle state or be activated when needed, but may reenter the idle state or be deactivated when not in use, thereby reducing power consumption, radio resource consumption, and/or wireless signal interference.

Figure 1:
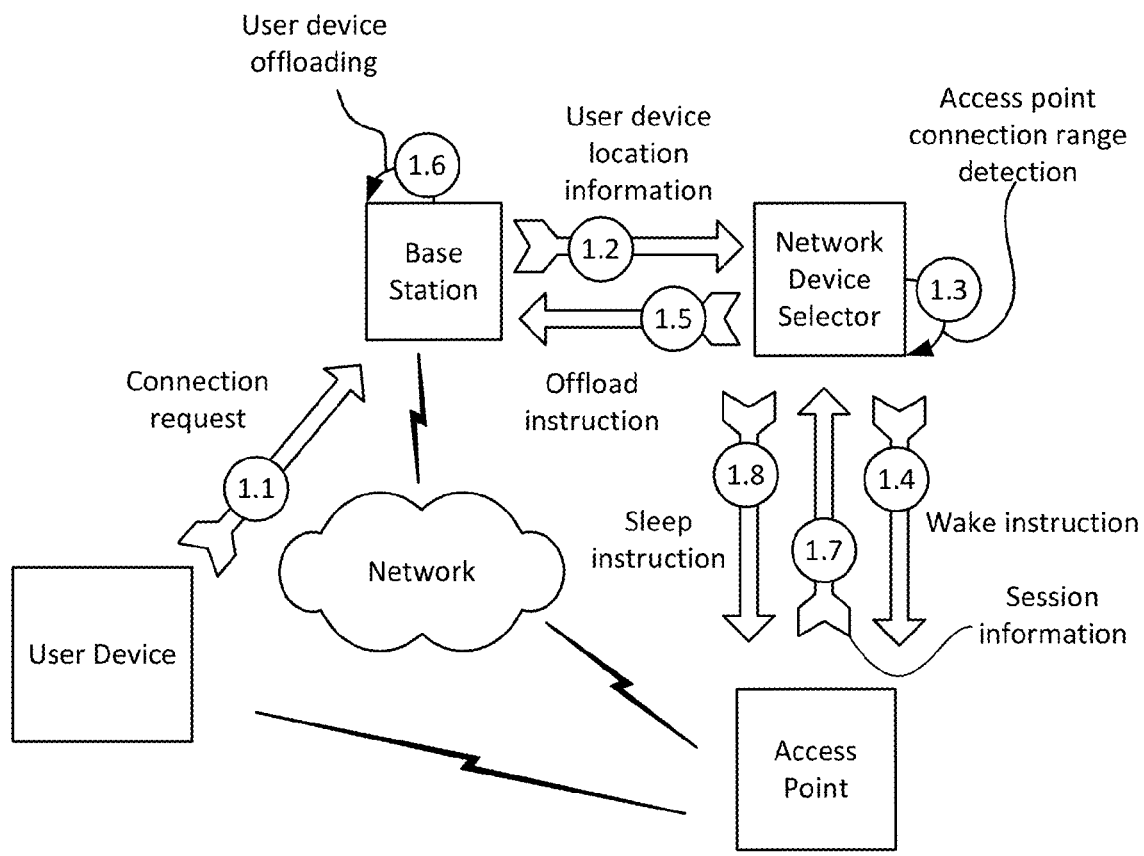
FIG. 1 illustrates an example overview of an implementation described herein.

FIG. 1 illustrates an example overview of an implementation described herein. As shown in FIG. 1, a user device may output a connection request (arrow 1.1) to a base station associated with a network (e.g., a cellular network), in order to access the network. Based on receiving the request, the base station may connect with the user device, and may output, to a network device selector, information identifying the location of the user device (arrow 1.2). The network device selector may identify that the user device is located within a communication range of an access point (arrow 1.3). In some implementations, the network device selector may output a "wake" instruction to activate the access point (arrow 1.4). For example, the network device selector may output the wake instruction to cause the access point to exit an idle state if the access point is deactivated or currently in the idle state (e.g., when the access point is powered off entirely, if communication hardware used by the access point to communicate with user devices is powered off, if software processes used to implement the communication hardware are inactive, etc.).

After outputting the wake instruction, the network device selector may output an offload instruction (arrow 1.5) to the base station, and the base station may handoff the user device (arrow 1.6) from the base station to the access point (e.g., to offload the user device from the base station to the access point to reduce load on the base station and/or provide greater bandwidth to the user device via the access point). The access point (e.g., after being activated), may periodically output session information to the network device selector (arrow 1.7). The session information may identify a quantity of sessions established between the access point and corresponding user devices, frequencies currently in use, and/or radio resources in use. For example, the session information may identify that a session exists between the user device and the access point. As session information changes (e.g., as user devices connect and disconnect from the access point), the network device selector may monitor the session information, and may output a sleep instruction (arrow 1.8) when the session information indicates that the access point is not in use (e.g., when no sessions exist between the access point and any user device). As a result, the access point may be activated or woken up from an idle state when needed (e.g., when a user device is located within a communication range of the access point), and may be deactivated (or reenter the idle state) when not in use.

Figure 2:
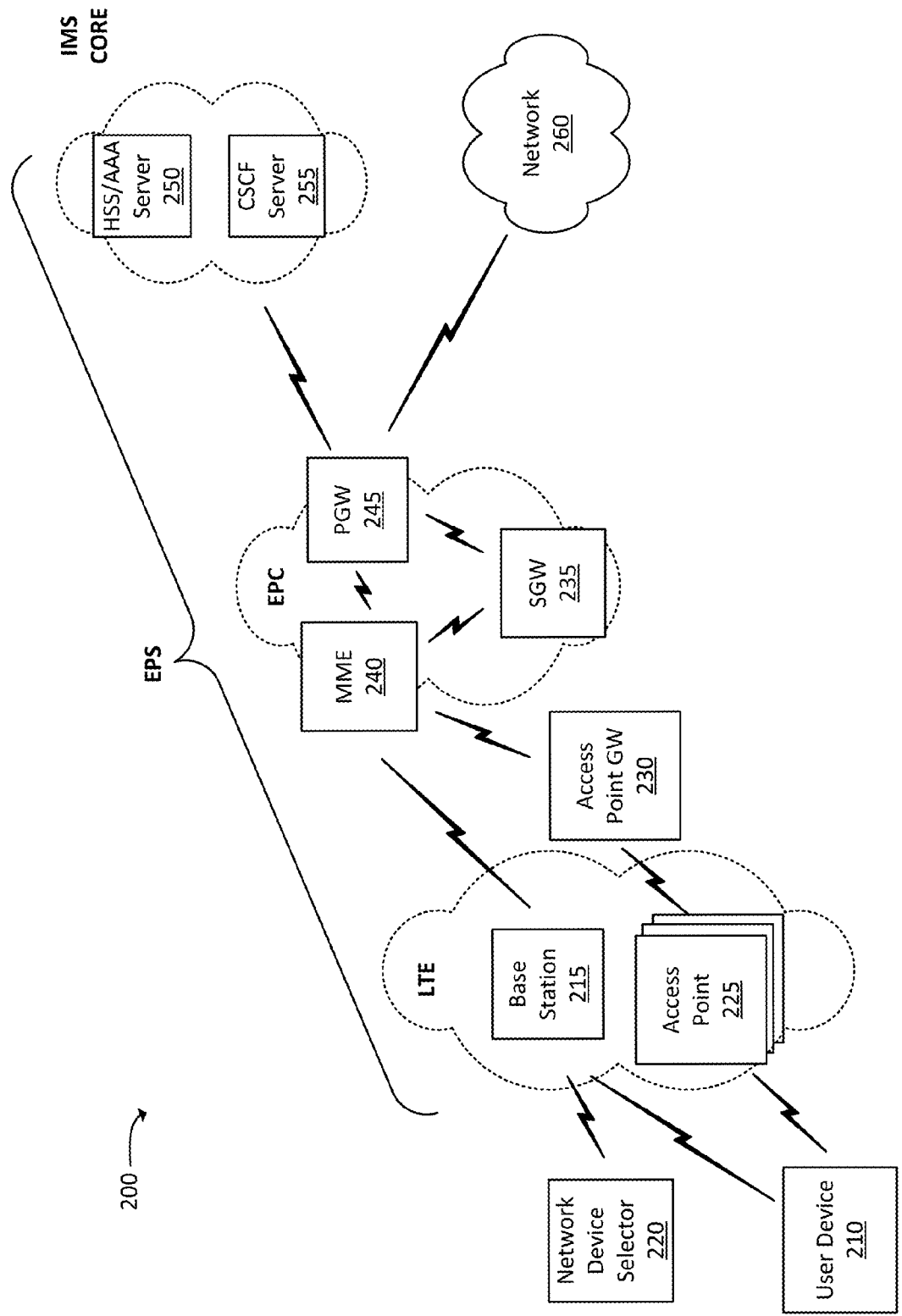
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user device 210, base station 215, network device selector 220, access points 225, access point gateway 230 (referred to "access point GW 230"), serving gateway 235 (referred to as "SGW 235"), mobility management entity device 240 (referred to as "MME 240"), a packet data network (PDN) gateway (PGW) 245 (referred to as "PGW 245"), home subscriber server (HSS)/authentication, authorization, accounting (AAA) server 250 (referred to as an "HSS/AAA server 250"), call service control function (CSCF) server 255 (referred to as "CSCF server 255"), and network 260.

Environment 200 may include an evolved packet system (EPS) that includes a long term evolution (LTE) network, an evolved packet core (EPC), and/or an Internet protocol (IP) multimedia subsystem (IMS) core that operate based on a third generation partnership project (3GPP) wireless communication standard. The LTE network may be a radio access network (RAN) that includes one or more base stations 215, such as eNodeBs (eNBs), via which user device 210 communicates with the EPC. The LTE network may also include one or more access points 225. The EPC may include SGW 235, MME 240, and/or PGW 245 and may enable user device 210 to communicate with network 260 and/or the IMS core. The IMS core may include HSS/AAA server 250 and/or CSCF server 255. The IMS core may manage authentication, connection initiation, account information, a user profile, etc. associated with user device 210.

User device 210 may include any computation or communication device, such as a wireless mobile communication device that is capable of communicating with base station 215 and/or a network (e.g., network 260). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network 260.

Base station 215 may include one or more network devices that receive, process, and/or transmit traffic, such as audio, video, text, and/or other data, destined for and/or received from user device 210. In an example implementation, base station 215 may be an eNB device and may be part of the LTE network. Base station 215 may receive traffic from and/or send traffic to network 260 via SGW 235 and PGW 245. Base station 215 may send traffic to and/or receive traffic from user device 210 via an air interface. One or more of base stations 215 may be associated with a RAN, such as the LTE network. In some implementations, base station 215 may be associated with a "macrocell."

Network device selector 220 may include one or more computing devices, such as a server device or a collection of server devices. In some implementations, the functionality associated with network device selector 220 may be included as part of the functionality of base station 215.

Network device selector 220 may store information regarding access point 225, such as location information for access point 225, information identifying a communications range of access point 225, information identifying frequencies via which access point 225 communicates, information identifying sub-channels via which access point 225 communicates, information identifying radios associated with access point 225, etc. Network device selector 220 may identify that user device 210 is within communications range of access point 225 (e.g., based on the location of user device 210 and the communications range information for access point 225), and may output an offload instruction to base station 215 to handoff user device 210 from base station 215 to access point 225. In some implementations, network device selector 220 may select a particular access point 225 if user device 210 is within communications range of multiple access points 225.

In some implementations, network device selector 220 may identify whether user device 210 is within communications range of access point 225 when user device 210 initially connects with base station 215. Additionally, or alternatively, network device selector 220 may identify whether user device 210 is within communications range of access point 225 when the load on base station 215 exceeds a particular threshold. Network device selector 220 may output a wake instruction to activate access point 225 (e.g., when user device 210 is within communications range of access point 225), and may output a sleep instruction to deactivate access point 225 (e.g., when access point 225 is not in use based on session information of access point 225). In some implementations, operations performed by network device selector 220 may be performed by base station 215.

Access points 225 may include one or more network devices. In some implementations, access point 225 may be a network device associated with a "microcell," a "femtocell," a "picocell," or the like, and may receive traffic from and/or send traffic to network 260 via access point GW 230, SGW 235, MME 240 and/or PGW 245. Access points 225 may be part of the LTE network. Access points 225 may communicate with MME 240 via access point GW 230.

In some implementations, access point 225 may implemented in buildings, fixtures (e.g., public lighting fixtures), utility poles, posts, etc. Access point 225 may send traffic to and/or receive traffic from user device 210 via an air interface. Access point 225 may output session information to network device selector 220 identifying sessions established with one or more user devices 210, frequencies associated with the sessions, and radio resources utilized. In some implementations, access point 225 may handoff user device 210 to another access point 225. For example, user device 210 may be handed off form one access point 225 to another based on receiving an instruction from network device selector 220. Alternatively, user device 210 may be handed off form one access point 225 to another without involving network device selector 220. In some implementations, access point 225 may receive discovery messages from network device selector 220 via a control channel even if access point 225 is in an inactive mode in which communication radios and/or software processes used to communicate with user device 210 are disabled. For example, access point 225 may receive the discovery messages from network device selector 220 using passive radios and/or low-powered hardware.

Access point GW 230 may include one or more network devices that transmit traffic to and/or from access points 225 and MME 240. In some implementations, access point GW 230 may appear to MME 240 as a base station 215. Access point GW 230 may thus functionally act as a virtual base station 215 that enables handovers from base station 215 to access point 225.

SGW 235 may include one or more network devices, that may aggregate traffic received from one or more base stations 220 and may send the aggregated traffic to network 260 via PGW 245. In one example implementation, SGW 235 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations. MME 240 may perform policing operations for traffic destined for and/or received from user device 210. MME 240 may authenticate user device 210 (e.g., via interaction with HSS/AAA server 250).

PGW 245 may include one or more network devices, such as a gateway, a router, a modem, a switch, a firewall, a NIC, a hub, a bridge, a proxy server, an OADM, or some other type of device that processes and/or transfers traffic. PGW 245 may, for example, provide connectivity of user device 210 to external packet data networks by being a traffic exit/entry point for user device 210. PGW 245 may perform policy enforcement, packet filtering, charging support, lawful intercept, and/or packet screening. PGW 245 may also act as an anchor for mobility between 3GPP and non-3GPP technologies.

HSS/AAA server 250 may include one or more computing devices, such as a server device or a collection of server devices. In some implementations, HSS/AAA server 250 may manage, update, and/or store, in a memory associated with HSS/AAA server 250, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 250 may include a device that performs authentication, authorization, and/or accounting (AAA) operations associated with a communication connection with user device 210.

CSCF server 255 may include one or more computing devices, such as a server device or a collection of server devices. In some implementations, CSCF server 255 may process and/or route calls to and from user device 210 via the EPC. For example, CSCF server 255 may process calls, received from network 260, that are destined for user device 210. In another example, CSCF server 255 may process calls, received from user device 210, that are destined for network 260.

Network 260 may include one or more wired and/or wireless networks. For example, network 260 may include a cellular network (e.g., a second generation ("2G") network, a third generation ("3G") network, a fourth generation ("4G") network, a fifth generation ("5G") network, a long-term evolution ("LTE") network, a global system for mobile ("GSM") network, a code division multiple access ("CDMA") network, an evolution-data optimized ("EVDO") network, or the like), a public land mobile network ("PLMN"), and/or another network. Additionally, or alternatively, network 260 may include a local area network ("LAN"), a wide area network ("WAN"), a metropolitan network ("MAN"), the Public Switched Telephone Network ("PSTN"), an ad hoc network, a managed Internet Protocol ("IP") network, a virtual private network ("VPN"), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
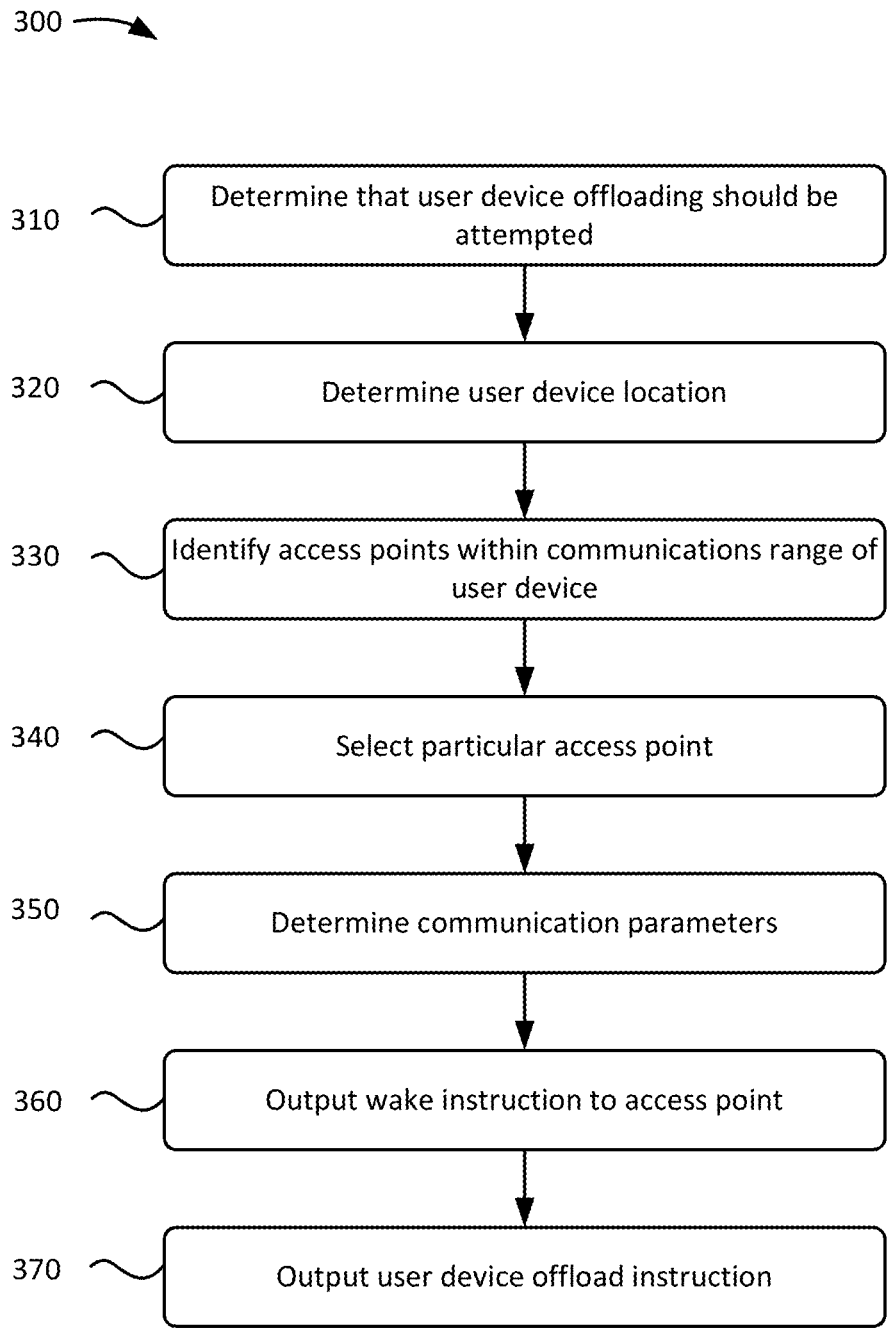
FIG. 3 illustrates a flowchart of an example process for activating an access point, and offloading the user device to the access point from a base station.

FIG. 3 illustrates a flowchart of an example process 300 for activating an access point, and offloading the user device to the access point from a base station. In some implementations, process 300 may be performed by network device selector 220. In some implementations, some or all of blocks of process 300 may be performed by one or more other devices. In FIG. 3, assume that access point 225 is currently in an idle state.

As shown in FIG. 3, process 300 may include determining that user device offloading should be attempted (block 310). For example, network device selector 220 may determine that user device offloading from base station 215 to network device selector 220 should be attempted (e.g., a communication between user device 210 and base station 215 should be transferred to network device selector 220) when user device 210 initially communicates with base station 215. Additionally, or alternatively, network device selector 220 may determine that the user device offloading should be attempted when a measure of load on base station 215 exceeds a threshold. Additionally, or alternatively, network device selector 220 may determine that the user device offloading should be attempted based on some other factor.

Process 300 may also include determining a location of the user device (block 320). For example, network device selector 220 may receive the location of user device 210 from base station 215 when user device 210 connects with base station 215. Additionally, or alternatively, network device selector 220 may determine the location of user device 210 via triangulation techniques. Additionally, or alternatively, a user of user device 210 may manually provide the location to network device selector 220. Additionally, or alternatively, network device selector 220 may determine the location of user device 210 using some other technique.

Process 300 may further include identifying access points within communications range of the user device (block 330). For example, network device selector 220 may identify one or more access points 225 within communications range of user device 210 based on the location of user device 210 and information identifying the locations and the communications ranges of the one or more access points 225. In some implementations, network device selector 220 may store information identifying the locations and communication ranges of access points 225. Additionally, or alternatively, network device selector 220 may output a discovery message over a control channel. The discovery message may be transmitted within a particular area within the location of user device 210, and may be received by access points 225 within the area. The access points 225 within the area may output a response indicating their respective locations. The discovery message may be received by access points 225 that may be in an idle state since the discovery message may be transmitted via a control channel and may be received via low-powered or passive type radios.

Process 300 may also include selecting a particular access point (block 340). For example, network device selector 220 may select a particular access point 225 with which user device 210 should communicate. In some implementations, network device selector 220 may select the particular access point 225 having the least amount of load. Additionally, or alternatively, network device selector 220 may select the particular access point 225 that is closest to user device 210. Additionally, or alternatively, network device selector 220 may select the particular access point based on a subscription level of user device 210. For example, different access points 225 may provide different levels of bandwidth, and user device 210 may be permitted to communicate with those access points that provide a level of bandwidth with which user device 210 is subscribed. In some implementations, block 340 may be omitted if only a single access point 225 is within communications range.

Process 300 may further include determining communication parameters (block 350). For example, network device selector 220 may determine communication parameters via which access point 225 and user device 210 may communicate. In some implementations, network device selector 220 may determine communication parameters, such as a frequency band, a radio, and/or a sub-channel via which access point 225 and user device 210 may communicate.

Additionally, or alternatively, network device selector 220 may determine some other communication parameter.

In some implementations, network device selector 220 may determine frequency band based on bands via which access point 225 is capable of communicating and frequency interference information (e.g., received via a spectrum analyzer). For example, network device selector 220 may select a frequency band via which access point 225 is capable of communicating, and having the lowest amount of interference. In some implementations, network device selector 220 may determine a sub-channel, associated with a particular frequency band, via which access point 225 and user device 210 may communicate. For example, if access point 225 is capable of communicating via a particular frequency band that is already occupied (e.g., if another access point 225 is communicating via the particular frequency band), then network device selector 220 may select a sub-channel of the particular frequency band so that access point 225 and user device 210 may communicate in a manner that minimizes interference. In some implementations, the sub-channel may correspond to a radio via which access point 225 and user device 210 communicate. Network device selector 220 may determine that the particular frequency band is occupied based on session information received from other access points 225 (e.g., information identifying frequencies occupied and/or sub-channels used by the other access points 225).

Process 300 may also include outputting a wake instruction the access point (block 360). For example, network device selector 220 may output the wake instruction to activate access point 225 or cause access point 225 to exit an idle state (e.g., by powering on a radio used to communicate with user device 210, execute software processes to communicate with user device 210, etc.). In some implementations, access point 225 may receive the wake instruction via a control channel and/or via passive hardware that may power on via a signal associated with the wake instruction. In some implementations, the wake instruction may include the communication parameters (e.g., the frequency, radio, and/or sub-channel via which access point 225 and user device 210 may communicate).

Process 300 may further include outputting a user device offload instruction (block 370). For example, network device selector 220 may output the offload instruction to base station 215 to cause base station 215 to handoff user device 210 to access point 225 (e.g., via interactions with MME 240 and access point GW 230. Once user device 210 has been handed off to access point 225, access point 225 and user device 210 may communicate in accordance with the communication parameters (e.g., via the frequency band, radio, and/or sub-channel). As a result, access point 225 may be activated when needed (e.g., when user device 210 is within communications range of access point 225), and load on base station 215 may be reduced when user device 210 is handed off from base station 215 to access point 225. Access point 225 may store session information identifying the communication between user device 210 and access point 225, in addition to the communication parameters associated with the communication (e.g., the frequency band used, the radio used, and/or the sub-channel used). Network device selector 220 may monitor the session information to deactivate access point 225 (e.g., when the session indicates that access point 225 is no longer being used and is not in communication with any user devices 210).

In some implementations, user device 210 may perform some or all of process 300. For example, user device 210 may identify access points within communications range (e.g., by outputting a discovery message and receiving responses to the message from access points 225 within communications range of user device 210). Further, user device 210 may output a wake instruction one or more access points 225 within communications range of user device 210. User device 210 may then communicate with access point 225 and discontinue communication with base station 215.

Figure 4:
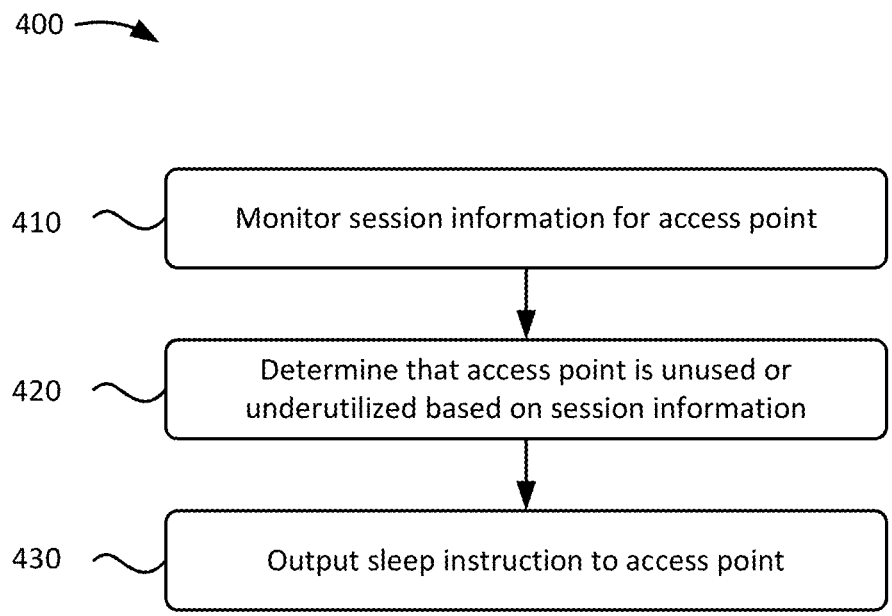
FIG. 4 illustrates a flowchart of an example process for deactivating an access point.

FIG. 4 illustrates a flowchart of an example process 400 for deactivating an access point. In some implementations, process 400 may be performed by network device selector 220. In some implementations, some or all of blocks of process 400 may be performed by one or more other devices. In FIG. 4, assume that access point 225 is in an active state (e.g., communication hardware is powered on and/or software processes used to communicate with user device 210 are active).

As shown in FIG. 4, process 400 may include monitoring session information for an access point (block 410). For example, network device selector 220 may monitor session information by periodically or intermittingly receiving the session information from access point 225 (e.g., when access point 225 is active). The session information may identify a quantity of sessions (if any) established between access point 225 and user devices 210. Network device selector 220 may monitor the session information as user devices 210 connect and disconnect from access point 225 (e.g., as user devices 210 are handed off from user device 210 to access point 225 and/or as user devices 210 are handed off from one access point 225 to another access point 225).

Process 400 may further include determining that the access point is unused or underutilized based on the session information (block 420). For example, network device selector 220 may determine that network device selector 220 is unused when the session information indicates that no sessions are established between access point 225 and user devices 210. In some implementations, network device selector 220 may determine that network device selector 220 is unused when access point 225 has not communicated with user device 210 after a threshold period of time. Additionally, or alternatively, network device selector 220 may determine that access point 225 is unused if no user devices 210 are within a threshold distance of access point 225. Network device selector 220 may determine that network device selector 220 is unused if user device 210 is heading away from access point 225. In some implementations, network device selector 220 may determine that access point 225 is underutilized if fewer than a threshold quantity of sessions exist between access point 225 and user devices 210.

Process 400 may also include outputting a sleep instruction to the access point (block 430). For example, network device selector 220 may output a sleep instruction to access point 225 based on determining that access point 225 is unused or underutilized. Based on receiving the sleep instruction, access point 225 may enter an idle state (e.g., by powering off entirely, powering off a radio used to communicate with user devices 210, and/or discontinuing software processes used to communicate with user devices 210). As a result, access point 225 may enter the idle state or be deactivated in order to reduce power consumption and/or wireless signal interference when access point 225 is not needed (e.g., when access point 225 is unused or underutilized). In some implementations, network device selector 220 may store information identifying that access point 225 is in the idle state such that sub-channels and/or other network resources previously in use by access point 225 may be made available for use by other access points 225.

In some implementations, network device selector 220 may determine that user device 210 is heading towards access point 225 and may not deactivate access point 225 based on determining that user device 210 is heading towards access point 225 (e.g., even if no sessions are established between access point 225 and any user devices 210). As a result, access point 225 may remain active when user device 210 is heading towards access point 225 so that user device 210 may communicate with access point 225 and reduce load on base station 215.

Figure 5:
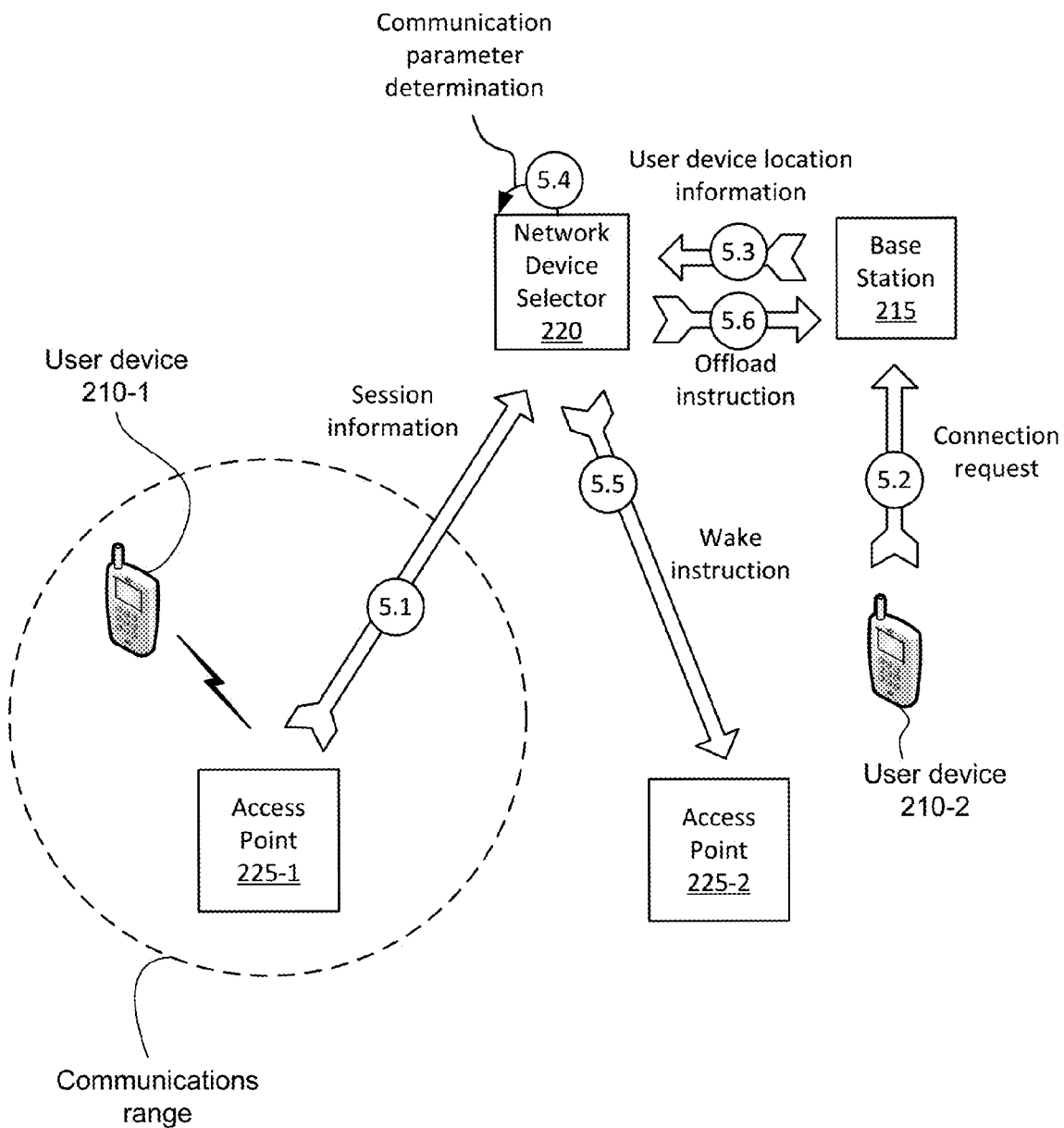
FIGS. 5-8 illustrate an example implementation for dynamically activating and deactivating access points.

FIGS. 5-8 illustrate an example implementation for dynamically activating and deactivating access points. In FIG. 5, assume that a first access point 225 (e.g., access point 225-1) is active and is transmitting wireless communication signals within a communications range. Further, assume that a first user device 210 (e.g., user device 210-1) is within the communications range and is in communication with access point 225-1. Given these assumptions, access point 225-1 may output session information (arrow 5.1) to network device selector 220 (e.g., since access point 225-1 is active). The session information may identify a frequency and sub-channel associated with the communication between access point 225-1 and user device 210-1.

In FIG. 5, further, assume that a second user device 210 (e.g., user device 210-2) is within communications range of a second access point 225 (e.g., access point 225-2), and that access point 225-2 is currently inactive. Given these assumptions, user device 210-2 may output a connection request to base station 215 (arrow 5.2), and base station 215 may establish communications with user device 210-2. Base station 215 may output information identifying the location of user device 210-2 to network device selector 220. Network device selector 220 may identify that access point 225-2 is within communications range of user device 210-2, and may determine communications parameters (5.4) based on session information received from access point 225-1. For example, assume that network device selector 220 stores information identifying that access point 225-1 and access point 225-2 communicate via a particular frequency. Further, assume that network device selector 220 receives session information from access point 225-1 identifying that access point 225-1 is communicating via a first sub-channel associated with the particular frequency. Given these assumptions, network device selector 220 may determine that access point 225-2 should communicate via the particular frequency and a second sub-channel different from the first sub-channel. Based on determining the communication parameters, network device selector 220 may output a wake instruction (arrow 5.5) to access point 225-2. The wake instruction may include the communication parameters and may activate access point 225-2. Network device selector 220 may then output an offload instruction (arrow 5.6) to direct base station 215 to handoff user device 210-2 to access point 225-2.

Figure 6:
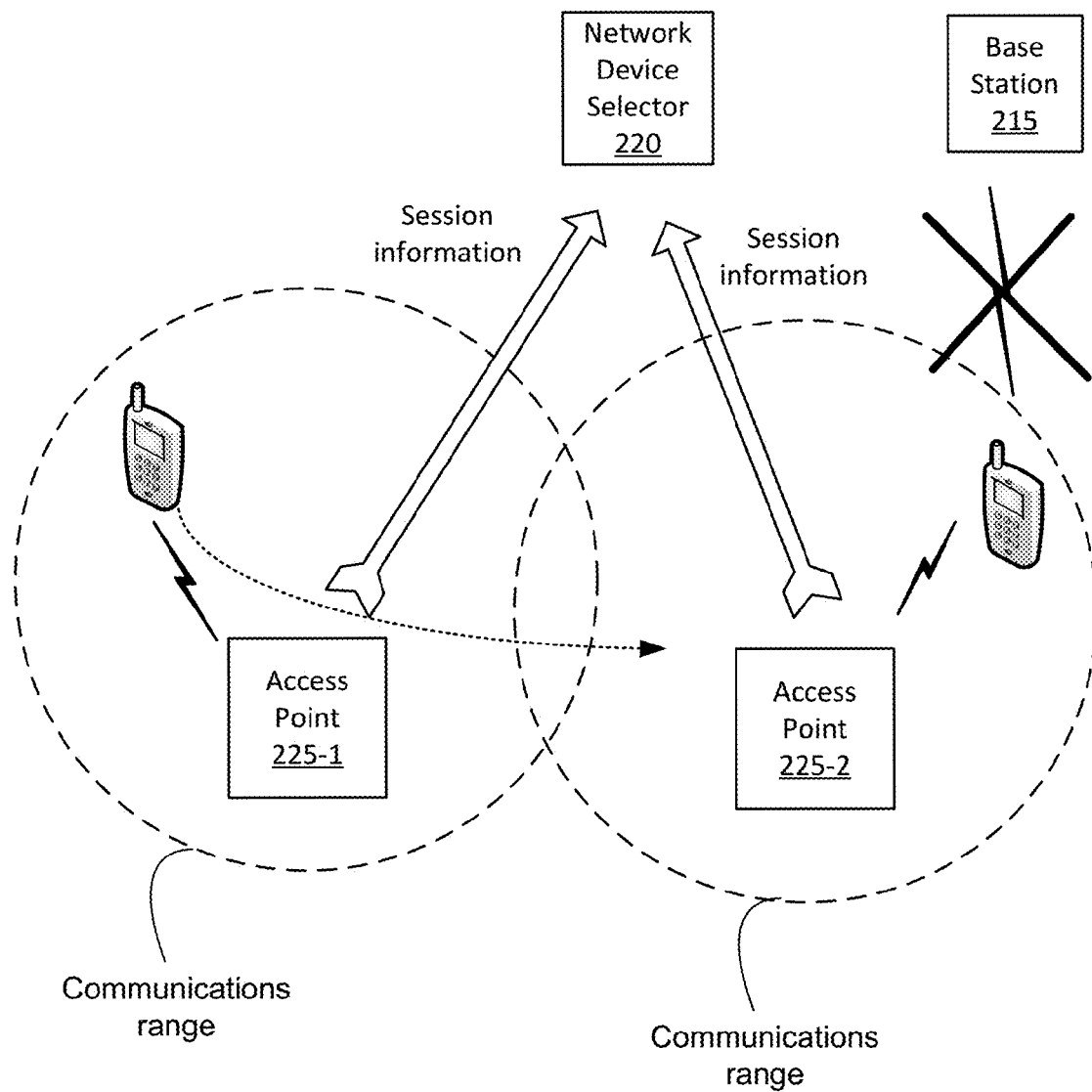

Referring to FIG. 6, access point 225-2 may output wireless communication signals within a communication range after receiving and executing the wake instruction. Access point 225-2 may establish communications with user device 210-2 in accordance with the communications parameters (e.g., after access point 225-2 has been activated and after base station 215 has handed off user device 210-2 to access point 225-2). As further shown in FIG. 6, user device 210-2 may discontinue communications with base station 215 after establishing communication with access point 225-2, thereby reducing load on base station 215. After access point 225-2 has been activated, access point 225-2 may output session information to network device selector 220 so that network device selector 220 may monitor the activity of access point 225-2 (e.g., to deactivate access point 225-2 when access point 225-2 becomes unused or underutilized). As further shown in FIG. 6, user device 210-1 may travel outside of the communications range of access point 225-1 to within the communications range of access point 225-2.

Figure 7:
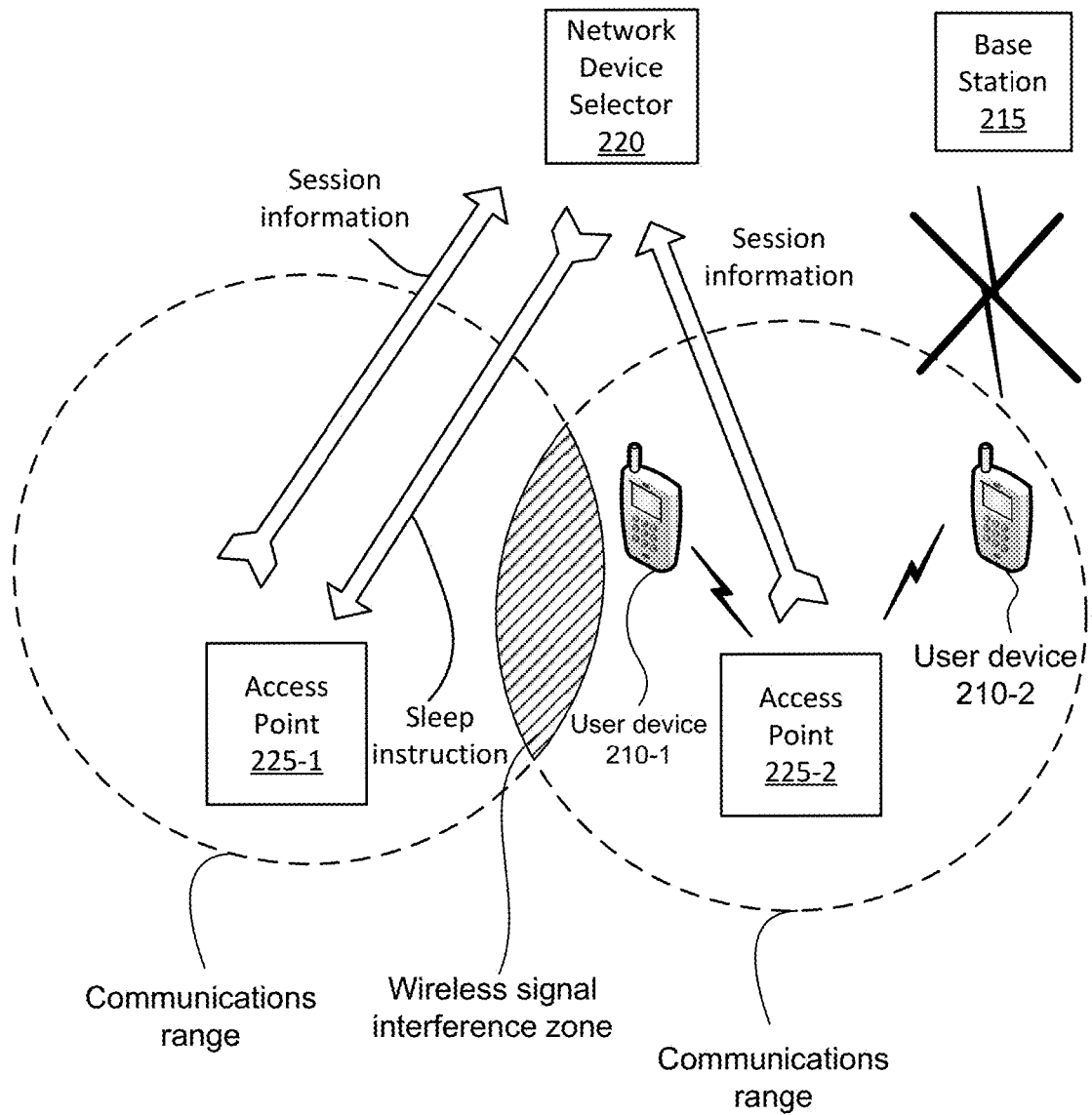

Referring to FIG. 7, user device 210-1 may discontinue communications with access point 225-1 and may establish communications with access point 225-2 (e.g., after user device 210-1 travels outside of the communications range of access point 225-1 to within the communications range of access point 225-2). For example, access point 225-2 may establish communications with user device 210-1 without involving base station 215. Since access point 225-1 is still active, access point 225-1 may continue to output session information to network device selector 220, and network device selector 220 may identify that access point 225-1 is unused (e.g., since user device 210-1 has traveled outside of the communications range of access point 225-1). Network device selector 220 may then output a sleep instruction to access point 225-1 to deactivate access point 225-1 (e.g., since access point 225-1 is no longer being used). In some implementations, network device selector 220 may deactivate access point 225-1 in order to eliminate a wireless signal interference zone that may exist when access point 225-1 and access point 225-2 are both active.

Figure 8:
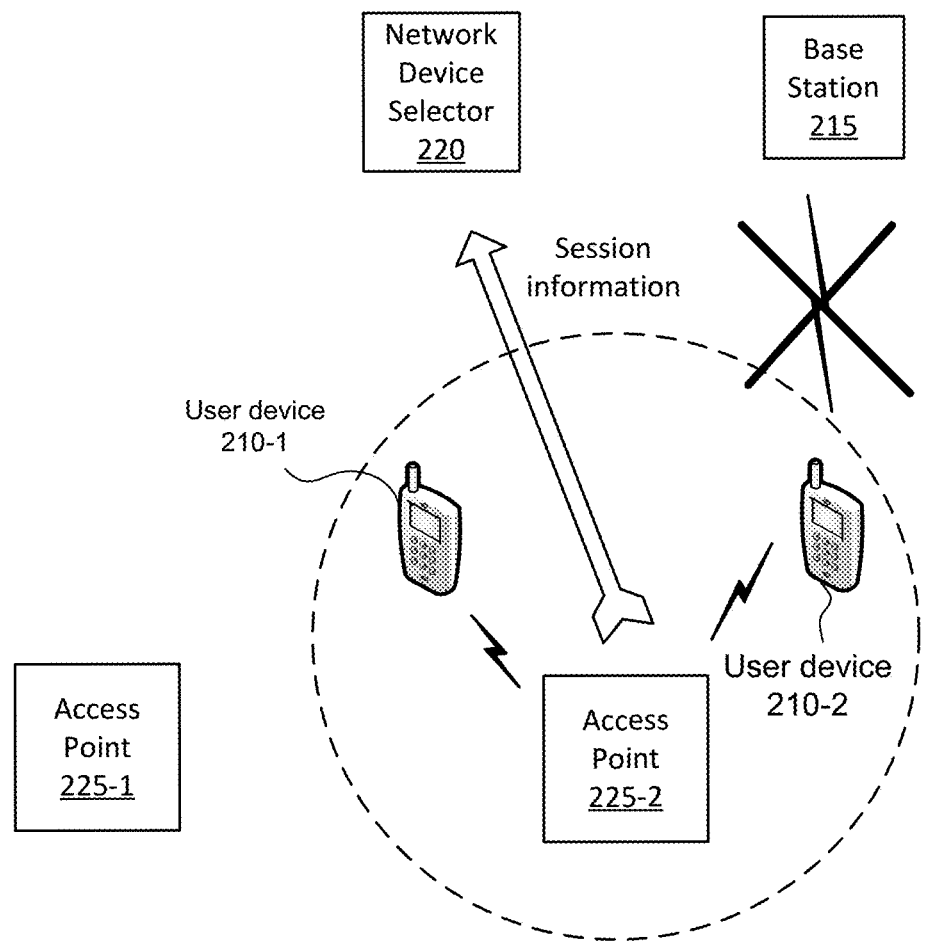

Referring to FIG. 8, the wireless signal interference zone may be eliminated by virtue of the deactivation of access point 225-1. As a result, access point 225-1 and access point 225-2 may be dynamically activated when needed (e.g., when user devices 210 are within communications range). Further, access point 225-1 and access point 225-2 may be dynamically deactivated when unused or underutilized, thereby reducing power consumption and wireless signal interference.

While a particular example is shown in FIGS. 5-8, it will be apparent that the above description is merely an example implementation. Other examples are possible and may differ from what was described with regard to FIGS. 5-8.

Figure 9:
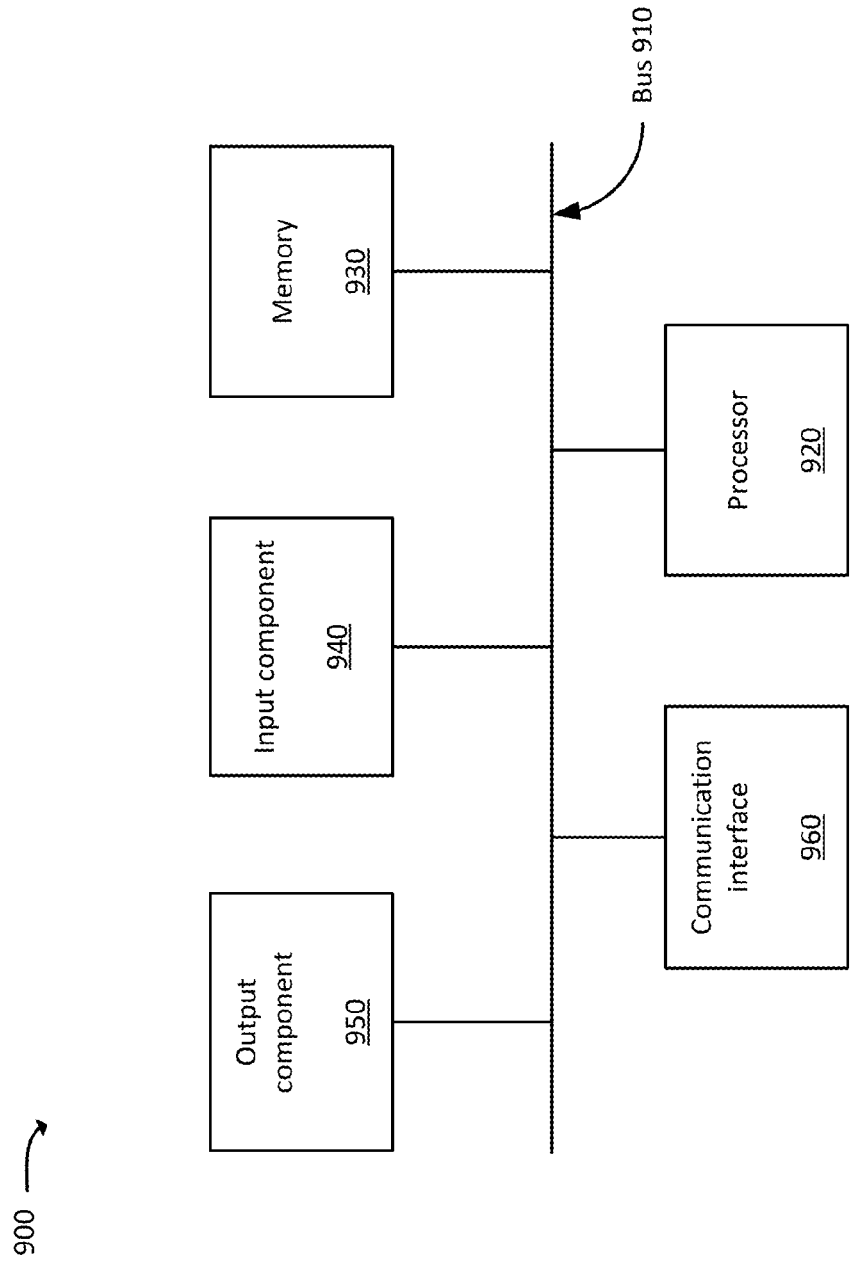
FIG. 9 illustrates example components of one or more devices, according to one or more implementations described herein.

FIG. 9 is a diagram of example components of device 900. One or more of the devices described above (e.g., with respect to FIGS. 1, 2, and 5-8) may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of nonvolatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 3 and 4, the order of the blocks may be modified in other implementations. Further, non-dependent blocks may be performed in parallel.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, and 5-8), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
  determining, by a network selection device, that a user device is located within a first wireless coverage area of a first network access device and a second wireless coverage area of a second network access device, the first wireless coverage area being larger than the second wireless coverage area and the first network access device and the second network access device operating in different frequency bands;
  determining, by the network selection device, that a communication between the user device and the first network access device should be transferred from the first network access device to the second network access device that is in an idle state;
  outputting, by the network selection device and while the second network access device is in the idle state, an instruction to cause the second network access device to exit the idle state, enter an active state, and communicate with the user device, the network selection device being external to the second network access device and the user device;

determining, by the network selection device, that the second network access device is unused or underutilized; and outputting, by the network selection device, and based on determining that the second network access device is unused or underutilized, an instruction to cause the second network access device to exit the active state and reenter the idle state.

2. The method of claim 1, wherein determining that the communication between the user device and the first network access device should be transferred includes determining that a measure of network load associated with the first network access device exceeds a threshold.

3. The method of claim 1, further comprising:
outputting an instruction to cause a first base station to handoff the communication to a second base station, based on outputting the instruction to cause the second network access device to exit the idle state.

4. The method of claim 1, wherein the second network access device is a particular second network access device of a plurality of second network access devices,
wherein outputting the instruction to cause the particular second network access device to exit the idle state includes:
outputting a discovery message to an area in which the user device is located,
receiving a response to the discovery message from the particular second network access device while the particular second network access device is in the idle state,
the response indicating that the particular second network access device is within a communications range of the user device.

5. The method of claim 1, wherein outputting the instruction to cause the second network access device to exit the idle state causes the second network access device to power on communications hardware used to communicate with the user device,
wherein outputting the instruction to cause the second network access device to reenter the idle state causes the second network access device to power off the communications hardware.

6. The method of claim 1, wherein the first network access device and the second device are different and are associated with a cellular network,
wherein the first network access device is associated with at least one of:
a macro cell, or
a base station
wherein the second network access device is associated with at least one of:
an access point,
a femtocell,
a microcell, or
a picocell.

7. The method of claim 1, wherein determining that the second network access device is underutilized or unused is based on session information received from the second network access device.

8. The method of claim 1, further comprising:
determining a frequency or sub-channel via which the second network access device and the user device should communicate,
wherein outputting the instruction to cause the second network access device to exit the idle state includes outputting information regarding the frequency or sub-channel.

9. A system comprising:
a network selection device, comprising:
a non-transitory memory device storing:
a plurality of processor-executable instructions; and
a processor configured to execute the processor-executable instructions, wherein executing the processor-executable instructions causes the processor to:
determine that a user device is located within a first wireless coverage area of a first network access device and a second wireless coverage area of a second network access device, the first wireless coverage area being larger than the second wireless coverage area and the first network access device and the second network access device operating in different frequency bands;
determine that a communication between the user device and the first network access device should be transferred from the first network access device to the second access device currently in an idle state;
output, while the second network access device is in the idle state, an instruction to cause the second network access device to exit the idle state, enter an active state, and communicate with the user device, the network selection device being external to the second network access device and the user device;
determine that the second network access device is unused or underutilized; and
output, based on determining that the second network access device is unused or underutilized, an instruction to cause the second network access device to exit the active state and reenter the idle state.

10. The system of claim 9, wherein executing the processor-executable instructions, to determine that the communication between the user device and the first network access device should be transferred, causes the processor to determine that a measure of network load associated with the first network access device exceeds a threshold.

11. The system of claim 9, wherein executing the processor-executable instructions further causes the processor to:
output an instruction to cause a first base station to handoff the communication to a second base station, based on outputting the instruction to cause the second network access device to exit the idle state.

12. The system of claim 9, wherein the second network access device is a particular second network access device of a plurality of second network access devices,
wherein executing the processor-executable instructions, to output the instruction to cause the particular second network access device to exit the idle state, causes the processor to:
output a discovery message to an area in which the user device is located,
receive a response to the discovery message from the particular second network access device while the particular second device is in the idle state,
the response indicating that the particular second network access device is within a communications range of the user device.

13. The system of claim 9, wherein executing the processor-executable instructions, to output the instruction to cause the second network access device to exit the idle state, causes the second network access device to power on communications hardware used to communicate with the user device or execute software processes used to communicate with the user device,
  wherein executing the processor-executable instructions, to output the instruction to cause the second network access device to reenter the idle state, causes the second network access device to power off the communications hardware or discontinue executing the software processes.

14. The system of claim 9, wherein the first network access device and the second network access device are different and are associated with a cellular network,
  wherein the first network access device is associated with at least one of:
    a macro cell, or
    a base station associated
  wherein the second network access device is associated with at least one of:
    an access point,
    a femtocell,
    a microcell, or
    a picocell.

15. The system of claim 9, wherein executing the processor-executable instructions, to determine that the second network access device is underutilized or unused, causes the processor to determine that the second network access device is underutilized or unused based on session information received from the second network access device.

16. The system of claim 9, wherein executing the processor-executable instructions further causes the processor to:
  determine a frequency or sub-channel via which the second network access device and the user device should communicate,
  wherein executing the processor-executable instructions, to output the instruction to cause the second network access device to exit the idle state, causes the processor to output information regarding the frequency or sub-channel.

17. A method comprising:
  determining, by a network selection device, that a user device is located within a first wireless coverage area of a first network access device and a second wireless coverage area of a second network access device, the first wireless coverage area being larger than the second wireless coverage area and the first network access device and the second network access device operating in different frequency bands;
  determining, by the network selection device, that a communication between the user device and the network access device is to be transferred to the access point;
  causing, by the network selection device, the communication between the user device and the network access device to be transferred to the access point;
  monitoring, by the network selection device, session information associated with an access point when the access point is in an active state,
  the access point being associated with a cellular network and corresponding to at least one of:
    a femtocell,
    a microcell, or
    a picocell;
  determining, by the network selection device, that the access point is unused or underutilized, while in the active state, based on the session information; and
  outputting, by the network selection device, an instruction to cause the access point to exit the active state and enter an idle state based on the determination that the access point is unused or underutilized, the network selection device being external to the access point and the user device.

18. The method of claim 17, wherein determining that the access point is unused or underutilized includes determining that fewer than a threshold quantity of sessions are established between the access point and corresponding user devices.

19. The method of claim 17, wherein outputting the instruction to cause the access point to enter the idle state causes the access point to power off communications hardware used to communicate with one or more user devices or discontinue software processes used to communicate with the one or more user devices.

20. The method of claim 17, further comprising:
  determining that an additional user device is located within a communications range of the access point after the access point has entered an idle state in response to receiving the instruction; and
  outputting an instruction to cause the access point to exit the idle state and communicate with the additional user device based on determining that the additional user device is located within the communications range of the access point.

* * * * *